United States Patent [19]

Miller

[11] 3,716,629

[45] Feb. 13, 1973

[54] PROCESS FOR PREPARING POTASSIUM PEROXYDISULFATE

[75] Inventor: Russell Alan Miller, Cheektowaga, N.Y.

[73] Assignee: FMC Corporation, New York, N.Y.

[22] Filed: Sept. 10, 1970

[21] Appl. No.: 71,271

[52] U.S. Cl. ................................................. 423/513
[51] Int. Cl. ............................................. C01b 15/08
[58] Field of Search ..................................... 23/114

[56] References Cited

UNITED STATES PATENTS 2,899,272  8/1959  Flach et al. ........................... 23/114

FOREIGN PATENTS OR APPLICATIONS 23,157   10/1910  Great Britain ......................... 23/114
571,378   2/1959  Canada ................................. 23/114

*Primary Examiner*—Earl C. Thomas
*Attorney*—Thomas B. Graham, Eugene G. Seems and Frank Ianno

[57] ABSTRACT

An improvement in a method for preparing potassium peroxydisulfate which comprises adding sodium hydroxide to the potassium peroxydisulfate-potassium sulfate-water mother liquor resulting from the reaction of ammonium peroxydisulfate and potassium sulfate, said addition increasing the sulfate solubility in the mother liquor and substantially reducing the sulfate contamination of the peroxydisulfate product.

4 Claims, No Drawings

PROCESS FOR PREPARING POTASSIUM PEROXYDISULFATE

BACKGROUND OF THE INVENTION

Potassium peroxydisulfate, a white crystalline solid, is a valuable chemical in view of its numerous uses which include bleaching agent, oxidation agent, reducing agent in photographic applications, antiseptic, and soap ingredient.

Several conventional methods for preparing potassium peroxydisulfate are well known to those skilled in the art. One such method involves the reaction in an aqueous medium, of ammonium peroxydisulfate and potassium hydroxide in the presence of potassium sulfate. While the desired peroxydisulfate is produced by this method, the product has been below purity specifications due to sulfate contamination. Thus, the mechanism of the reaction is such that the sulfates present in the mother liquor are converted to potassium sulfate which then coprecipitates with the potassium peroxydisulfate when the sulfate concentration reaches approximately 69 grams/liter at 30° C.

In addition to this difficulty with product contamination, the prior art process requires an increased frequency of peroxydisulfate mother liquor disposal with a corresponding increase in raw material cost.

SUMMARY OF THE INVENTION

It is the primary object of this invention to modify the procedures for preparing potassium peroxydisulfate in such a manner as to substantially increase the purity of the product as well as the efficiency and economy of the process. Various other objects and advantages of this invention will become apparent from the following description thereof.

It has now been surprisingly found that by conducting the ammonium peroxydisulfate-potassium sulfate reaction in the presence of sodium hydroxide, rather than potassium hydroxide, a substantial increase in the purity of the peroxydisulfate product is achieved. Thus, the addition of sodium hydroxide increases the sulfate solubility in the system, thereby allowing the peroxydisulfate to precipitate substantially free of sulfate contamination until the sulfate concentration in the system reaches the much higher concentration level of about 142 grams/liter at 30° C.

Furthermore, the novel process of this invention reduces the frequency of disposal of the peroxydisulfate mother liquor as well as the raw material costs.

DESCRIPTION OF THE PREFERRED EMBODIMENTS:

The novel process of this invention proceeds according to the following equation:

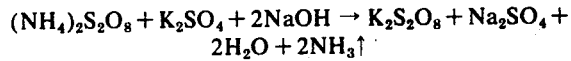

$$(NH_4)_2S_2O_8 + K_2SO_4 + 2NaOH \rightarrow K_2S_2O_8 + Na_2SO_4 + 2H_2O + 2NH_3\uparrow$$

In conducting the process, ammonium peroxydisulfate and potassium sulfate are mixed with water, sodium hydroxide is added and the temperature of the system is raised to from about 30° to 50° C. in order to dissolve the reactants. The resulting solution is maintained at this temperature, while under agitation, for a period of from about 5 to 10 minutes. Thereafter, the solution is cooled to about 30° C. or below causing precipitation of the potassium peroxydisulfate. The purity of the white crystalline peroxydisulfate product will generally exceed about 98 percent till the point at which the sulfate ($SO_4^=$) concentration in the system exceeds about 142 grams/liter at 30° C. and coprecipitation of potassium sulfate occurs.

With respect to proportions, the determination of the concentration of the three primary reagents in relation to one another is based on the stoichiometric equivalencies of the reaction.

The instant process can be conducted on a continuous basis and the economy thereof further improved by recycling the mother liquor recovered after filtration of the potassium peroxy-disulfate and utilizing this recycle as the reaction mixture upon addition of the required amount of reactants thereto.

By way of specific illustration of the novel process of this invention, a peroxydisulfate mother liquor consisting of 4.2 grams potassium peroxydisulfate, 33.3 grams potassium sulfate and 262.8 grams water was charged into a reaction vessel whereupon 43.5 grams ammonium peroxydisulfate and 30.4 grams of a 50 percent, by weight, aqueous sodium hydroxide solution were added thereto. The solution, while under agitation, was heated to 50° C. in order to dissolve the reactants and then cooled to 30° C. to precipitate the potassium peroxydisulfate product. The white crystalline product was filtered yielding 25.5 grams having a purity of 98.7 percent.

Thereafter, 11.4 grams of ammonium peroxydisulfate and 8.5 grams potassium sulfate were added to the filtrate. The solution was heated to 46° C. in order to dissolve the reactants whereupon 8 grams of a 50 percent, by weight, aqueous sodium hydroxide solution was added thereto. Upon cooling the solution to 30° C. and filtering the resultant precipitate, 12.7 grams of potassium peroxydisulfate was recovered having a purity of 98.4 percent.

The process was then repeated four additional times until the product purity dropped below 98 percent. An analysis of the final mother liquor revealed its contents to be as follows:

75.2 grams/liter $S_2O_8^=$, 142.3 grams/liter $SO_4^=$, 33.5 grams/liter $K^+$ and 50 grams/liter $Na^+$.

In previous operation, the reaction of ammonium peroxy-disulfate and potassium hydroxide (in the presence of potassium sulfate) was utilized in place of sodium hydroxide. It was noted that the purity of the potassium peroxydisulfate product dropped below 98 percent when the $SO_4^=$ concentration in the mother liquor was approximately 69 grams/liter at 30° C. It thus is evident that the novel process of this invention clearly outperforms the prior art process as to producing potassium peroxydisulfate at increased sulfate concentrations in the mother liquor, thereby extending the duration of the run, increasing raw material efficiency, and producing a high purity product.

Summarizing, it is seen that this invention provides a modified process for producing high purity potassium peroxy-disulfate. Variations may be made in proportions, procedures and materials without departing from the scope of this invention as defined by the following claims.

What is claimed is:

1. In the process for preparing potassium peroxydisulfate which comprises reacting substantially stoichiometric amounts of one mole of ammonium peroxydisulfate and one mole of potassium sulfate in an aqueous medium for formation of the potassium peroxydisulfate and cooling the resulting solution and recovering potassium peroxydisulfate, the improvement which comprises conducting said reaction in the presence of stoichiometric amount of sodium hydroxide in the ratio of two moles for each mole of ammonium peroxydisulfate whereby the ammonia is released fully and removed from the aqueous medium.

2. The process of claim 1 wherein the temperature of the aqueous reaction mixture is elevated to a level above 30° and below about 50° C. and maintained in that range, until substantially complete removal of ammonia, and subsequently cooled to below about 30° to crystallize the potassium peroxydisulfate.

3. The process of claim 2 wherein the mother liquor recovered after crystallization and filtration from the potassium peroxydisulfate is admixed with additional ammonium peroxydisulfate and potassium sulfate in about 1:1 molar ratio and sodium hydroxide in about 2 moles per mole of ammonium peroxydisulfate to provide a new reaction mixture in which components are at substantially the same level of concentration as in the initiation of the reaction.

4. The process in accordance with claim 3 which is repeated until such operation has residual sulfate concentration in the aqueous reaction system exceed about 142 grams/liter at 30°C.

* * * * *